United States Patent
Ranjeet et al.

(10) Patent No.: US 10,791,352 B2
(45) Date of Patent: *Sep. 29, 2020

(54) GENERATING CUSTOMIZED VIDEO PREVIEWS

(71) Applicant: Adobe Inc., San Jose, CA (US)

(72) Inventors: Angela Ranjeet, Bangalore (IN); Kiran Chandra Zagabattuni, Bangalore (IN); Pavan Kumar Bvn, Bangalore (IN); Niraj Gupta, Haryana (IN); Neeraj Goel, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,962

(22) Filed: May 31, 2019

(65) Prior Publication Data

US 2019/0289349 A1 Sep. 19, 2019

Related U.S. Application Data

(63) Continuation of application No. 14/933,995, filed on Nov. 5, 2015, now Pat. No. 10,356,456.

(51) Int. Cl.

| | |
|---|---|
| H04N 21/25 | (2011.01) |
| H04N 21/8549 | (2011.01) |
| H04N 21/466 | (2011.01) |
| H04N 21/234 | (2011.01) |
| H04N 21/258 | (2011.01) |
| H04N 21/45 | (2011.01) |
| G11B 27/031 | (2006.01) |
| G11B 27/034 | (2006.01) |
| G11B 27/036 | (2006.01) |

(52) U.S. Cl.
CPC ......... *H04N 21/252* (2013.01); *G11B 27/031* (2013.01); *G11B 27/034* (2013.01); *G11B 27/036* (2013.01); *H04N 21/23424* (2013.01); *H04N 21/25891* (2013.01); *H04N 21/4532* (2013.01); *H04N 21/4667* (2013.01); *H04N 21/8549* (2013.01)

(58) Field of Classification Search
CPC ........... H04N 21/252; H04N 21/23424; H04N 21/25891; H04N 21/4532; H04N 21/4667; H04N 21/8549; G11B 27/031
See application file for complete search history.

(56) References Cited

U.S. PATENT DOCUMENTS 5,907,836 A * 5/1999 Sumita .................... G06F 16/30
707/754
6,577,808 B1 * 6/2003 Oestreicher .......... G11B 15/087
386/239

(Continued)

*Primary Examiner* — Nathan J Flynn
*Assistant Examiner* — Tung T Trinh
(74) *Attorney, Agent, or Firm* — Shook, Hardy & Bacon, L.L.P.

(57) ABSTRACT

A dynamically created video preview can be provided to a viewer by stitching relevant video clips from a target video based on a viewer profile of the viewer. In various embodiments, a computer receives a request from a viewer to preview a video. The computer can then select one or more clips from the video based on the viewer profile of the viewer. Thereafter, the computer can generate a customized video preview from the one or more selected clips for the viewer based on the viewer profile. Other embodiments may be described and/or claimed.

16 Claims, 4 Drawing Sheets

(56) References Cited

U.S. PATENT DOCUMENTS

| | | | |
|---|---|---|---|
| 6,714,909 B1* | 3/2004 | Gibbon | G06F 16/7834 704/246 |
| 7,082,255 B1* | 7/2006 | Jun | H04N 7/163 386/291 |
| 7,424,204 B2* | 9/2008 | Nakamura | G06F 16/7834 386/248 |
| 7,769,760 B2* | 8/2010 | Watanabe | G06F 16/907 707/737 |
| 8,086,491 B1* | 12/2011 | Matz | G06Q 30/02 705/14.49 |
| 8,103,546 B1* | 1/2012 | Des Jardins | G06Q 30/0241 365/200 |
| 8,893,030 B1* | 11/2014 | Anderson | G06F 3/04842 715/764 |
| 9,298,820 B2* | 3/2016 | Kosaka | G06F 16/783 |
| 9,389,754 B2* | 7/2016 | Reese | G06F 3/0482 |
| 10,356,456 B2* | 7/2019 | Ranjeet | H04N 21/4532 |
| 10,419,830 B2* | 9/2019 | Packard | H04N 21/25841 |
| 2001/0041053 A1* | 11/2001 | Abecassis | A63F 13/63 386/291 |
| 2002/0018637 A1* | 2/2002 | Saito | H04N 21/44 386/241 |
| 2002/0057297 A1* | 5/2002 | Grimes | G06F 16/9535 715/810 |
| 2002/0129375 A1 | 9/2002 | Kim et al. | |
| 2002/0199188 A1* | 12/2002 | Sie | H04N 21/4532 725/35 |
| 2003/0023757 A1* | 1/2003 | Ishioka | H04L 29/06 709/246 |
| 2003/0065802 A1* | 4/2003 | Vitikainen | H04L 29/06027 709/231 |
| 2003/0154486 A1* | 8/2003 | Dunn | H04N 21/4314 725/91 |
| 2003/0212995 A1* | 11/2003 | Kitamori | H04N 21/4345 725/41 |
| 2004/0073923 A1* | 4/2004 | Wasserman | H04N 21/44222 725/46 |
| 2004/0167767 A1* | 8/2004 | Xiong | G10L 25/00 704/1 |
| 2005/0120368 A1* | 6/2005 | Goronzy | G06F 16/735 725/28 |
| 2005/0154973 A1* | 7/2005 | Otsuka | G06F 16/7834 715/201 |
| 2005/0271146 A1* | 12/2005 | Errico | H04N 21/4348 375/240.28 |
| 2006/0075454 A1* | 4/2006 | Jung | H04N 21/854 725/135 |
| 2006/0236245 A1* | 10/2006 | Agarwal | G11B 27/34 715/716 |
| 2007/0124679 A1* | 5/2007 | Jeong | G11B 27/28 715/723 |
| 2007/0245379 A1* | 10/2007 | Agnihortri | H04N 21/44008 725/46 |
| 2008/0250080 A1* | 10/2008 | Arrasvuori | G06F 16/435 |
| 2008/0298767 A1* | 12/2008 | Jeong | G06F 16/7854 386/241 |
| 2008/0313541 A1* | 12/2008 | Shafton | G06F 16/78 715/725 |
| 2009/0067807 A1* | 3/2009 | Hirohata | G06F 16/70 386/278 |
| 2009/0077499 A1* | 3/2009 | Svendsen | G06F 16/48 715/833 |
| 2009/0199230 A1* | 8/2009 | Kumar | G06Q 30/0268 725/32 |
| 2009/0251614 A1* | 10/2009 | Barbieri | G06F 16/739 348/700 |
| 2010/0030713 A1* | 2/2010 | Simpson | G06Q 30/0254 706/11 |
| 2010/0104261 A1* | 4/2010 | Liu | G11B 27/34 386/241 |
| 2010/0251295 A1* | 9/2010 | Amento | H04N 21/475 725/38 |
| 2010/0281263 A1* | 11/2010 | Ugawa | G11B 20/00123 713/176 |
| 2011/0093798 A1* | 4/2011 | Shahraray | G11B 27/28 715/763 |
| 2011/0212756 A1* | 9/2011 | Packard | H04N 21/8126 463/1 |
| 2011/0293250 A1* | 12/2011 | Deever | H04N 5/275 386/290 |
| 2012/0057852 A1* | 3/2012 | Devleeschouwer | H04N 5/262 386/278 |
| 2012/0072946 A1* | 3/2012 | Cranman | H04N 21/4312 725/28 |
| 2014/0032548 A1* | 1/2014 | Gilra | G06F 16/48 707/736 |
| 2014/0082670 A1* | 3/2014 | Papish | H04N 21/462 725/45 |
| 2014/0205266 A1* | 7/2014 | Atri | H04N 21/44008 386/248 |
| 2014/0236956 A1* | 8/2014 | Matsuura | G06F 16/9535 707/740 |
| 2015/0032740 A1* | 1/2015 | Rao | G06F 16/24578 707/725 |
| 2015/0037013 A1* | 2/2015 | Thomas | G11B 27/007 386/343 |
| 2015/0104147 A1* | 4/2015 | Kosaka | G06F 16/4393 386/239 |
| 2015/0172787 A1* | 6/2015 | Geramifard | H04N 21/252 725/40 |
| 2016/0029106 A1* | 1/2016 | Chen | G06F 16/738 386/282 |
| 2016/0105733 A1* | 4/2016 | Packard | H04N 21/25841 725/32 |
| 2016/0225405 A1* | 8/2016 | Matias | G11B 27/031 |
| 2016/0261929 A1* | 9/2016 | Lee | H04N 21/84 |

* cited by examiner

GENERATING CUSTOMIZED VIDEO PREVIEWS

CROSS-REFERENCE TO RELATED APPLICATIONS

This application is a continuation of U.S. application Ser. No. 14/933,995, filed Nov. 5, 2015, entitled "Generating Customized Video Previews", the entire contents of which are herein incorporated by reference.

BACKGROUND

A trailer or preview traditionally refers to a commercial for a feature film that will be exhibited in the future. Like other commercials, one purpose for offering a trailer for a feature film is to stimulate interests among the audience so that some individuals will choose to view the actual film, e.g., in a cinema. Nowadays, video previews are not limited to the film industry, but have ubiquitous applications when a brief showing of a longer video is desired, e.g., for a television show, a music program, or even a homemade birthday party recording.

Video previews generally are brief. By way of example, the Motion Picture Association of America (MPAA) requires theatrical trailers to be limited to no longer than two minutes and thirty seconds. Therefore, a movie trailer usually only consists of a few abbreviated scenes from the film. To better attract viewers, it is common to select scenes from the most exciting or otherwise noteworthy parts of the film. The same principle generally applies to other types of video previews.

Currently, online video platforms provide a static video preview for each featured video, such as for a movie. A static video preview may contain a few selected video clips from the actual video. However, the static video preview is usually generic for all viewers. Sometimes, different versions of static video previews may be offered in different regions, languages, or time periods. However, static video previews do not differentiate diverse individual preferences of viewers. As a result, a static video preview may arouse interests for some users, but fail to do so for many other users.

SUMMARY

Embodiments of the present disclosure relate to generating video previews based on viewers' profiles. In this regard, a user can request a preview for a video on an online video server, e.g., by clicking a thumbnail image representing the video preview. Instead of delivering a generic preview to all users, the online video server can dynamically create video previews by stitching a few video clips selected based on the viewer profile of the user. As such, the customized preview becomes highly relevant and attractive for this user. Therefore, the user can make a better informed decision whether to watch the full video based on the customized preview.

In some implementations, to build such a customized video preview, video clips from highly ranked video categories indicated in the viewer profile may be selected. Within a video category highly ranked by the user, video clips in the video category are also ranked, e.g., based on feedback from all users. Thus, a top ranked video clip in the video category highly ranked by the user is likely to be selected to build such a customized video preview. Finally, all video clips selected for the user are assembled in a customized sequence based on the viewer profile.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
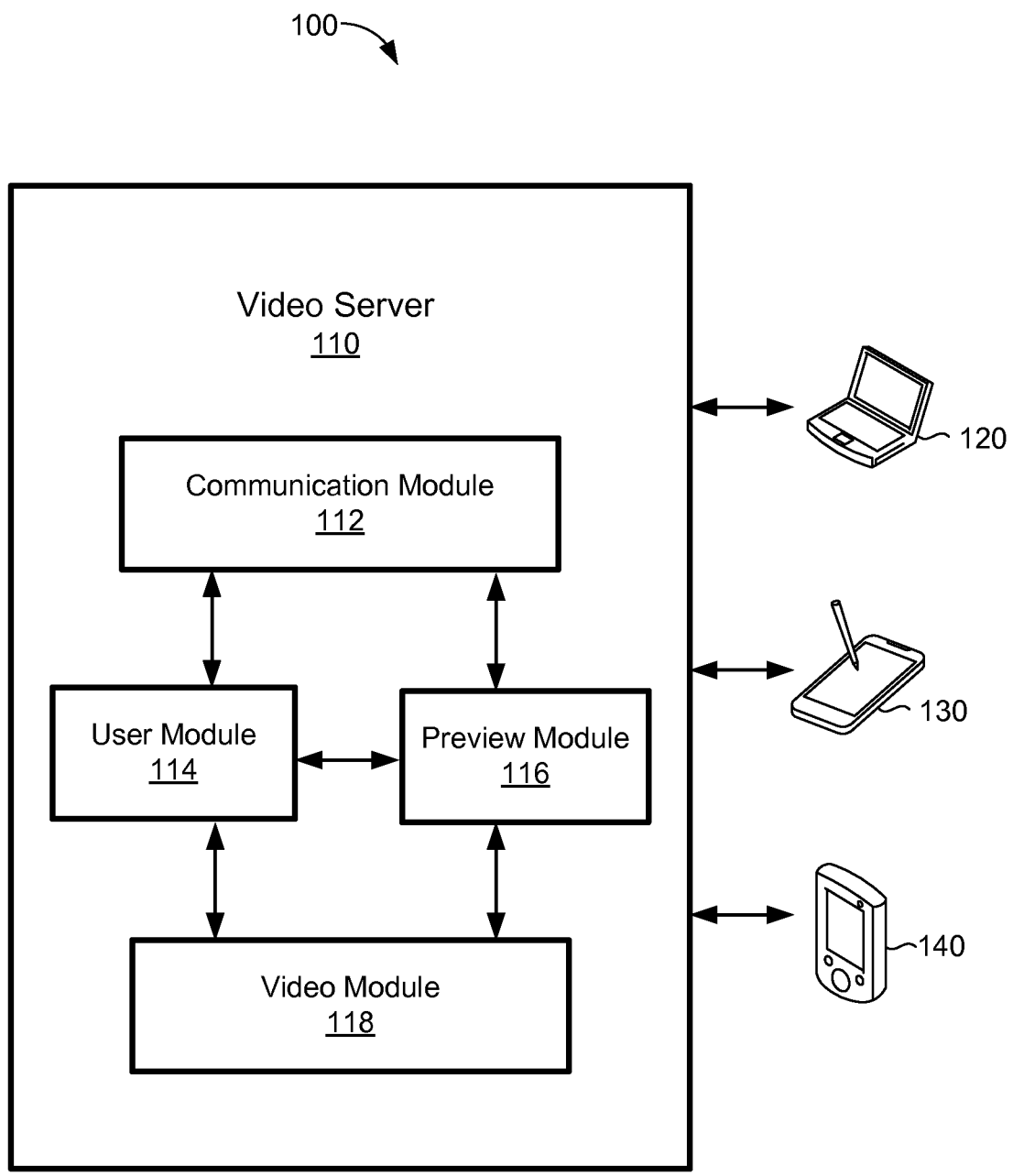
FIG. 1 is a schematic diagram illustrating an example implementation of a system for generating video previews based on viewer profiles, incorporating aspects of the present disclosure, in accordance with various embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different components, modules, blocks, steps, etc., similar to the ones described in this document, in conjunction with other present or future technologies.

A brief video preview provides users a general idea of the content of the actual longer video. Thus, after only spending a few minutes or less, a user can make better informed decision in terms of purchasing or watching the full-length video, like a movie. However, online video platforms generally only provide a static video preview for each featured video. Even though different versions of static video previews may be offered in different regions, languages, or time periods, static video previews are not tailored to individual preferences of viewers, even though different viewers likely have different preferences in terms of what portions of the video are more interesting to them. As a result, a static video preview is unlikely to be viewed favorably by all viewers.

In this disclosure, methods and systems for generating video previews based on a viewer profile are disclosed. In this regard, instead of delivering a generic preview to all users, the online video server can dynamically create customized video previews by assembling a few video clips selected based on the viewer profile of the user. At a high level, video clips from highly ranked video categories indicated in the viewer profile may be selected to build such a customized video preview. Within a video category, a top ranked video clip in the video category can be selected to build such a customized video preview. Finally, video clips selected for the user can be assembled in a customized sequence based on the viewer profile. As such, a customized video preview becomes highly relevant and more interesting to the user. Therefore, the user can make a better informed decision to purchase or watch the full-length video based on the customized video preview.

By way of example, assume a user is browsing through a movie catalog on an online video portal. On the portal's user interface, assume there is a thumbnail of the film poster for each movie. When a user tries to get more information about a movie indicated by a thumbnail, e.g., by hovering the mouse on the thumbnail, a customized video preview will be presented to the user based on the user's profile. For instance, if the viewer profile suggests that the user is more inclined towards watching romantic movies, the customized video preview of the present movie can contain a romantic scene from the movie to better engage the user.

In implementation, in order to create customized video previews, a list of video categories are defined, e.g., according to the film industry norm or by a system administrator to video server 110 as discussed herein. In some embodiments, video categories include genres, such as action, adventure, comedy, crime, mystery, romance, science fiction, etc. Further, subgenres can also be defined under a genre. As an example, the subgenres of martial arts, military fiction, spy fiction, western fiction, etc., may be further specified under the genre of action. Even further, cross-genres can also be defined by combining two or more genres or subgenres. As an example, romantic comedy (aka RomCom) is a cross-genre which combines the romance genre with the comedy genre.

Further, the scenes or clips of the video can be identified and categorized in advance, e.g., into one or more previously discussed video categories, such as genres, subgenres, or cross-genres. In some embodiments, such scene classification processes can be automated, e.g., based on neural networks, or heuristic algorithms. By way of example, for identifying a romantic scene, captions can be searched for few words from a reference dictionary related to romance. For identifying an action scene, video can be analyzed for high motion activity and fast edits, and for the same reason, audio can be analyzed for audio effects to recognize an action scene.

Further, viewer profiles can be established for users. In some embodiments, a viewer profile includes demographic or classification information of the user, such as gender, age, location, language, profession, etc. In some embodiments, the user's rank for previously discussed genres, subgenres, or cross-genres are established, either manually by the user or automatically generated by a server, e.g., based on the historical viewing history of the user.

Using the categories of clips within a video, various portions of the video can be selected in accordance with preferences within the viewer profile. Such selected portions can be aggregated to generate a customized video preview for the user. By way of example, the viewer profile of a user indicates that the user is a male French speaker who ranked comedy much higher than action with respective quantified weights of $W_c$ and $W_a$. For a selected movie, the customized preview will likely have an emphasis on comedy scenes rather than action scenes when the selected movie has both. Further, the time allocated to comedy scenes and action scenes, as well as the assembling sequence of these selected scenes, in the video preview can be determined based at least in part on the quantified weights of $W_c$ and $W_a$ in this case. Consequently, the customized video preview can increase the potential match between the user's preferences and the full-length video summarized in a rather short preview. Therefore, a customized video preview based on the viewer profile is going to not only better engage the user but also better facilitate the user to determine whether to view the full-length video.

Referring now to FIG. 1, a schematic diagram illustrates an example system 100 for generating video previews based on viewer profiles in accordance with various embodiments. Users can request and access customized video previews from video server 110 via various user devices, such as computer 120, tablet 130, or smartphone 140. Video server 110 is a server computing device configured to generate video previews based on viewer profiles. As illustrated in FIG. 1, video server 110 includes communication module 112, user module 114, preview module 116, and video module 118, operatively coupled with each other. The Video server, computer 120, tablet 130, and/or smartphone 140 may be any computing device, such as computing device 400 in FIG. 4. Generally, a computing device refers to any computing or other electronic equipment that executes instructions and includes any type of processor-based equipment that operates an operating system or otherwise executes instructions. A device will typically include at least a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smartphones, pagers, digital tables, laptop computers, tablet computers, Internet appliances, other processor-based devices, and television viewing devices. A device is to be used as a special-purpose computing device to provide specific functionality offered by applications and modules, such as to generate video previews based on viewer profiles or display a video preview thereinafter.

The phrase "video preview" refers to any showing of a full-length video. Commonly, video previews can be used as a commercial for the underlying full-length video to boost viewers' interest in purchasing or viewing the full-length video, e.g., a film or a television show. Often, a video preview is composed from selected video clips in the full-length video. However, in some embodiments, a video preview may include video clips external from the full-length video. By way of example, a video preview for a film can include an excerpt of an interview with the director or main actors in the film.

The phrase "viewer profile" refers to any individual information related to a viewer, which can be used to facilitate a device, e.g., a server, to generate customized video previews for the viewer. In some embodiments, a viewer profile includes demographic or classification information of the user, such as gender, age, location, language, profession, etc. In some embodiments, a viewer profile includes the user's preferences or rank information for different genres, subgenres, or cross-genres of the videos.

In operation, and at a high level, video server 110 receives a request for a video preview from a user device via communication module 112. In response, user module 114 retrieves a viewer profile associated with the user who is requesting the customized video preview. In some embodiments, user module 114 needs to establish a new viewer profile for the user if there is no existing viewer profile associated with the user. Further, if new information related to the user is received, the viewer profile can be automatically updated. Based on the viewer profile, preview module 116 can generate a customized video preview for the user. As described in more detail herein, a customized video preview can be generated based on video categories of portions of the video that align with categorical preferences indicated in the viewer profile. Such video categories and/or video portions can be referenced from the video module 118 to facilitate generation of the customized video preview. Subsequently, video server 110 can deliver the dynamically generated video preview for the user, e.g., streaming the video preview to one of the user devices associated with the user, such as computer 120, tablet 130, or smartphone 140.

As mentioned, the video server 110 of FIG. 1 includes communication module 112, user module 114, preview module 116, and video module 118, although various implementations are contemplated and suitable for carrying aspects of the present invention. The communication module 112 generally enables video server 110 to communicate with various user devices, e.g., utilizing one or more wireless or wired networks. These wireless or wired networks may include public and/or private networks, such as, but not limited to, LANs, WANs, or the Internet. In some embodiments, these wireless networks may include one or more WPANs, WLANs, WMANs, or WWANs. In some embodiments, these wireless networks may include cellular networks, for example, Wideband Code Division Multiple Access (WCDMA), Global System for Mobile Communications (GSM), Long Term Evolution (LTE), and the like.

The communication module 112 might receive a video request from a user device, such as computer 120, tablet 130, or smartphone 140. The video request from the user device can be triggered in any number of manners. For instance, in some cases, a viewer might explicitly request the video preview, e.g., by clicking on a preview button on a user interface or mouse hover. In other cases, the viewer might implicitly request the video preview, e.g., by loading a video portal's home page, which automatically triggers playing the video preview associated with the video portal, e.g., the video of the day.

User module 114 is to build and update viewer profiles, further to provide viewer profiles, e.g., to preview module 116 in response to its queries to retrieve viewer profiles. In some embodiments, user module 114 is to build a viewer profile including demographic or classification information of the user, such as gender, age, location, language, profession, etc. Users can directly input such information to video server 110 via user module 114, e.g., via the user signup process or user account updating process. User module 114 can automatically, in some embodiments, collect user information for building or updating a viewer profile, e.g., determining the user's preferred language via browsers used by the user, or determining the user's location based on the IP address associated with a user device, e.g., computer 120, tablet 130, or smartphone 140. By way of example, a viewer profile may include age group, sex, location, education, profession, marital status, political affiliation, income status, hobbies, past viewing history, past viewing behaviors, etc.

In some embodiments, user module 114 builds a viewer profile including the user's preference or rank for previously discussed video categories, e.g., genres, subgenres, or cross-genres. User module 114 can directly take users' manual input, e.g., via a user interface. A user can manually assign or select a metric of likeness, e.g., in a range from 0 to 1 or another suitable range, to each video category.

Alternatively or additionally, user module 114 can automatically adjust the user's preference, e.g., based on the viewing history of the user. By way of example, as a user keeps on watching movies, every watched movie can be counted as one or more votes for corresponding video categories associated with the movie on the viewer profile. Over time, the viewing pattern of the user is reflected on the viewer profile, and user module 114 can continue adjusting the viewer profile as the user's viewing pattern evolves. For example, user module 114 can track videos viewed by a viewer associated with various categories. For each video category, an adjusted weight of a specific video category can be determined by dividing the number of votes (e.g., viewings) received for the specific video category by the total number of votes (e.g., viewings) received from the viewer.

In some embodiments, without any viewing history, a new user is assigned with one of the many default viewer profiles, such as based on the demographic information of the user, e.g., age group, location, etc. A default viewer profile may be generalized based on users with similar characteristics, such as the same age group. Such a default can be changed, for example, automatically or based on user input.

The following are some example partial viewer profiles with various video categories and weights indicated. The viewer associated with Table 1 likes romance and comedy most, and the viewer associated with Table 3 likes romance and drama most. Action and sci-fi are the top two favorable video categories of the viewer associated with Table 2. Among these examples, the weights of all video categories are normalized. In other embodiments, the weights of all video categories may need not to be normalized.

TABLE 1

Partial Viewer Profile

| Video Categories | Weight |
| --- | --- |
| Romance | 0.4 |
| Action | 0.05 |
| Comedy | 0.3 |
| Drama | 0.05 |
| Musical | 0 |
| Sci-fi | 0.15 |
| Thriller | 0.05 |
| Horror | 0 |

TABLE 2

Partial Viewer Profile

| Video Categories | Weight |
| --- | --- |
| Romance | 0.05 |
| Action | 0.4 |
| Comedy | 0.1 |
| Drama | 0.05 |
| Musical | 0 |
| Sci-fi | 0.35 |
| Thriller | 0.05 |
| Horror | 0 |

TABLE 3

Partial Viewer Profile

| Video Categories | Weight |
| --- | --- |
| Romance | 0.4 |
| Action | 0.05 |
| Comedy | 0.15 |
| Drama | 0.25 |
| Musical | 0 |
| Sci-fi | 0.15 |

TABLE 3-continued

Partial Viewer Profile

| Video Categories | Weight |
|---|---|
| Thriller | 0 |
| Horror | 0 |

Viewer profiles can be stored and accessed for use in generating video previews. As described, the viewer profiles may be updated as the viewer preferences change.

The video module 118 can store or otherwise enable access to various videos. In this regard, the video module 118 might store, or remotely access video clips, for use in generating a video preview. By way of example, in accordance with a request to view a video preview for video A, video portions associated with video A might be referenced to generate the video preview.

Further, video module 118 can associate a video with one or more video categories. A video category can be any type of category that can be used to classify a video or portion thereof. For example, as previously discussed, the list of video categories may include main genres (e.g., action, comedy, crime, mystery, romance, science fiction, etc.), subgenres (e.g., martial arts, military fiction, spy fiction, western fiction, etc., for action), or cross-genres (e.g., romantic comedy, etc.). Categories may also include non-genre-based categories, such as animation, documentary, etc. In some embodiments, video categories may also be classified based on time-related parameters, such as when the video was made (e.g., 80s, 90s, etc.), or such as when the video initially became accessible to users at a video portal (e.g., last week, last month, last year, etc.). Video categories may also be classified based on the main actors or actresses in the video. In some embodiments, video categories may also be classified based on pricing information, e.g., purchase price or rental price. In some embodiments, video categories may also be classified based on viewers' membership information, e.g., a list of premium videos may be complied for premium members in a video portal. In other embodiments, video categories may be organized in any classification methodology suitable for video delivery services. Even further, in some embodiments, a customized video preview may be stored, either persistently or temporarily, e.g., by video module 118, so that the customized video preview can be retrieved quickly for the same user or other similar users in the future.

In various embodiments, for the purposes of the present disclosure, the phrase "video clip" refers to any clips of video whose length is less than the length of the full video. In some embodiments, video clips may be chosen from key scenes in the video. In some embodiments, video clips may be randomly chosen, e.g., based on a time constraint. In general, multiple video clips are to be assembled in a particular sequence to form a video preview of the full video.

Video module 118 can additionally or alternatively identify and classify various video clips in a video into various video categories. The video as a whole may be classified into one or more video categories as discussed herein; similarly, each video clip can also be classified into one or more video categories, such as genres, subgenres, or cross-genres. In some embodiments, such classification processes for the video as a whole or the video clip as a part can be automated, e.g., based on neural network learning algorithms or heuristic prediction algorithms as discussed previously. By way of example, various algorithms known in the art in artificial neural networks (ANNs) can be used for classifying video categories, such as supervised learning for pattern recognition, or even unsupervised learning algorithms. For instance, various heuristic cues can be utilized for classification, such as keywords from a reference dictionary related to romance can be searched again the captions in a movie to identify a romantic scene.

In some embodiments, such classification processes can be at least partially based on manual effort, such as using crowdsourcing models. Crowdsourcing generally refers to a process of collaborating, usually online, of a crowd of people on a project. Video module 118 can provide a user interface to solicit classification information of a video clip from various viewers. For example, video module 118 can select a random video clip from a video and offers it as a free preview to viewers. Viewers are requested to classify the random video clip into one or more suitable video categories afterwards. Viewers may also be requested to rank the random video clip as compared to other video clips in the same video category using a predefined scale, such as on a scale of 1-10. In this way, video module 118 not only obtains the classification information, but also receives ranking information of video clips within a video category. Even further, viewers may be asked to provide individual preferences to this random video clip, e.g., to user module 114. Subsequently, user module 114 can utilize such information in building or updating viewer profiles.

Preview module 116 generates customized video previews based on viewer profiles, e.g., provided by user module 114. By way of example, a viewer profile of a user indicates that the user is a male French speaker who ranked comedy much higher than action with respective quantified weights of 0.8 and 0.2. In one embodiment, for a selected movie, preview module 116 will build a customized video preview based on this viewer profile that emphasizes comedy scenes rather than action scenes when the selected movie has both, e.g., preview module 116 will allocate more time to comedy scenes than action scenes, e.g., proportional to their respective weights. For instance, assume that the video preview is limited to two minutes. Accordingly, based on the normalized weights of 0.8 and 0.2 for comedy and action respectively for this viewer, one minute and thirty-six seconds will be allocated to comedy scenes, and twenty-four seconds will be allocated to action scenes. Within a video category, the allocated time will be further distributed to those top ranked video clips in the video category. Further, preview module 116 may determine a sequence to assemble selected scenes in the video preview based at least in part on their quantified weights. In this case, the comedy scenes will be placed before the action scenes.

Consequently, the customized video preview can increase the potential match between the user's preferences and the full-length video summarized in a rather short preview. Granted, in some instances, a viewer may be drawn to a substantially action movie if he happened to just like the comedy scene in the preview. However, in most instances, it is conceivable that the viewer is in the best position to evaluate scenes in a genre he likes, at least for himself. Therefore, a customized video preview based on the viewer profile is going to not only better engage the user but also better facilitate the user to determine whether to view the full video.

In this regard, instead of delivering a generic preview to all users, video server 110 can dynamically create customized video previews by assembling a few video clips selected based on the viewer profile of the user. In implementation, video clips from those highly ranked video categories indicated in the viewer profile may be selected to build such a customized video preview. Within a video category, a top ranked video clip in the video category is likely to be selected to build such a customized video preview. Finally, all video clips selected for the user are assembled in a customized sequence based on the viewer profile. As such, a customized video preview becomes highly relevant and more interesting to the user. Therefore, the user can make a better informed decision to purchase or watch the full video based on the customized video preview.

By way of example, in reference to FIG. 1 herein, preview module 116 can reference the user profile, retrieved via user module 114, to identify user preferences for various video categories. Based on the user preferences, indicated on the user profile, preview module 116 can choose a few top ranked video categories to build a customized video preview. Subsequently, preview module 116 can allocate respective time to each chosen video categories, e.g., based on the total length allowed for the video preview and the respective ranks or weights associated with chosen video categories on the viewer profile. Within a chosen video category, preview module 116 can access video clips, e.g., via video module, and select one or more video clips from the chosen video category, e.g., based on the respective ranks or weights of the one or more video clips within that video category. Further, preview module 116 will assemble selected video clips into a customized video preview. The customized video preview may then be delivered to the requesting user device, e.g., tablet 130.

Figure 3:
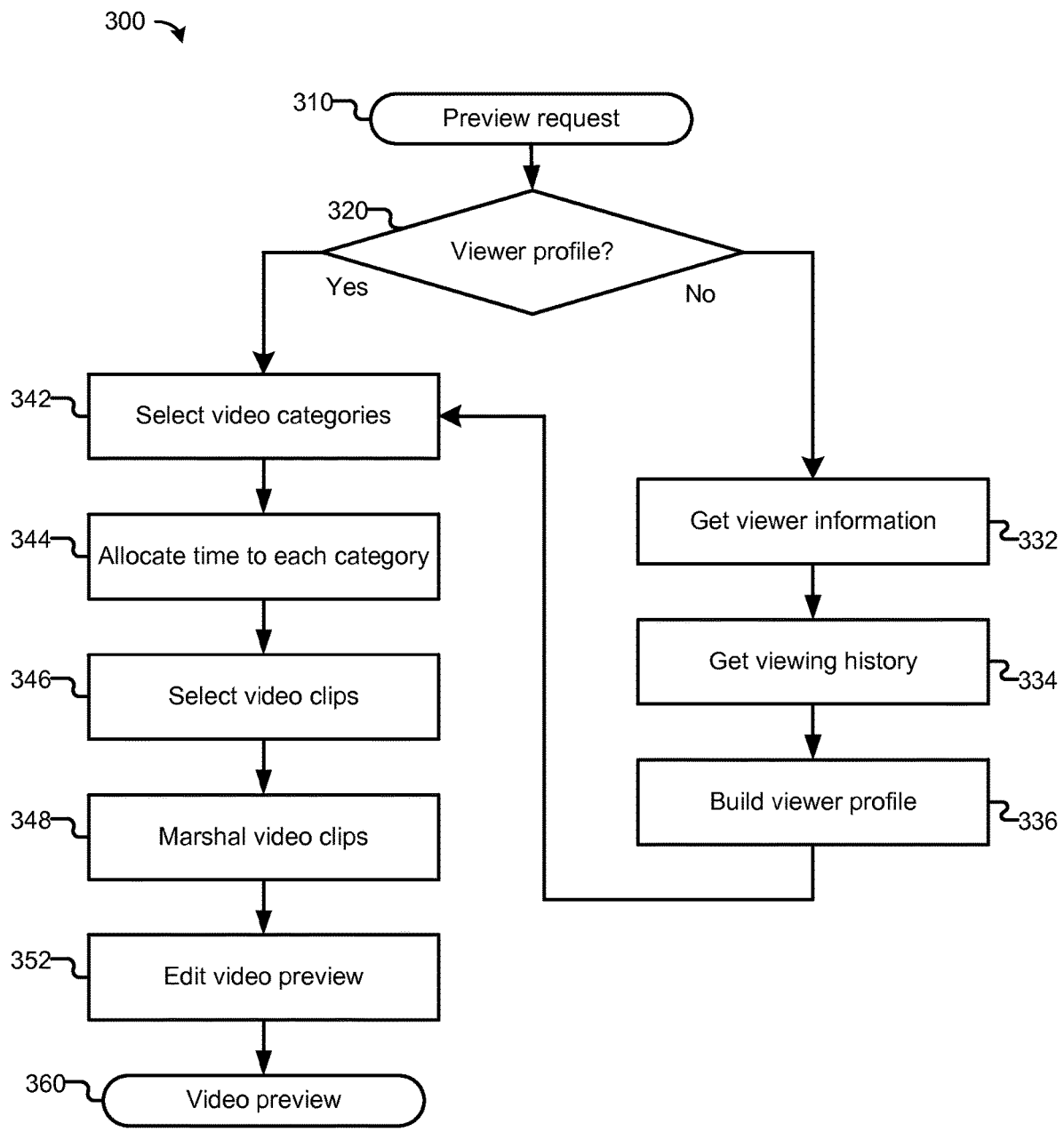
FIG. 3 is a flow diagram of another example process for generating video previews based on viewer profiles, which may be practiced by an example apparatus, incorporating aspects of the present disclosure, in accordance with various embodiments.

In various embodiments, video server 110 may be implemented differently than depicted in FIG. 1. As an example, user module 114 can be combined with preview module 116 to form a comprehensive module to generate video previews based on viewer profiles. In some embodiments, components depicted in FIG. 1 can have a direct or indirect connection not shown in FIG. 1. In some embodiments, some of the components depicted in FIG. 1 may be divided into multiple modules, such as what is illustrated in FIG. 3. Further, one or more components of video server 110 may be located across any number of different devices or networks. As an example, video module 118 may be implemented as an integrated subsystem of a data server (not shown) rather than located in system 100.

Figure 2:
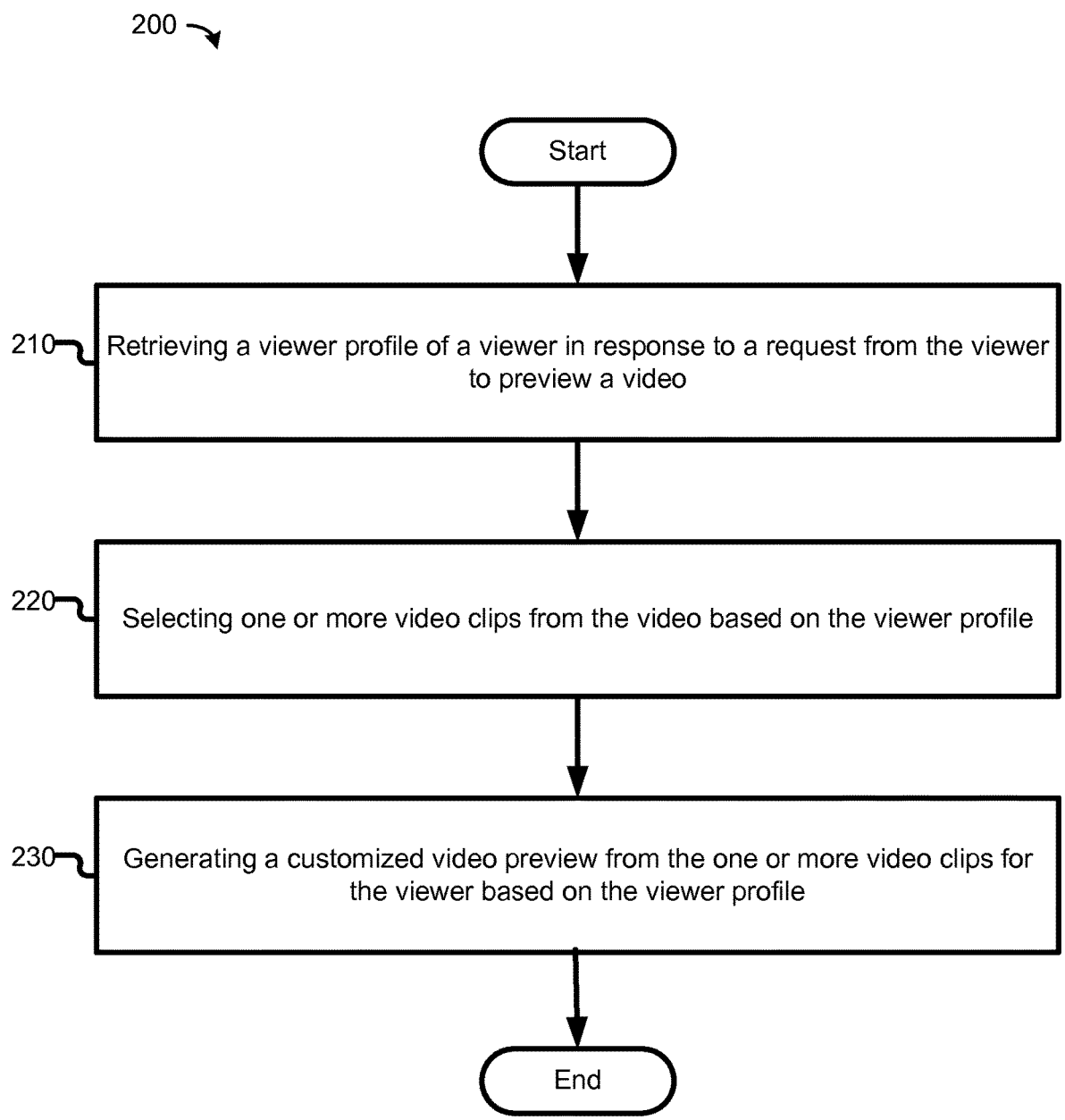
FIG. 2 is a flow diagram of an example process for generating video previews based on viewer profiles, which may be practiced by an example apparatus, incorporating aspects of the present disclosure, in accordance with various embodiments.

Referring now to FIG. 2, it is a flow diagram of an example process 200 for generating video previews based on viewer profiles, which may be practiced by an example apparatus in accordance with various embodiments. Process 200 may be performed by processing logic that comprises hardware (e.g., circuitry, dedicated logic, programmable logic, microcode, etc.), software (e.g., instructions run on a processing device to perform hardware simulation), or a combination thereof. The processing logic is to be configured to generate video previews. As such, process 200 may be performed by a computing device, e.g., video server 110, to implement one or more embodiments of the present disclosure. In various embodiments, process 200 can have fewer or additional operations, or perform some of the operations in different orders.

In various embodiments, the process begins at block 210, where a video server retrieves, e.g., from user module 114 of FIG. 1, a viewer profile of a viewer in response to a request from the viewer to preview a video. In some embodiments, the viewer would explicitly request the video preview, e.g., by clicking on a preview button on a user interface. In some embodiments, the viewer may have implicitly requested the video preview, e.g., by loading a video portal's home page, which automatically triggers playing the video preview associated with the video portal, e.g., the video of the day.

In some embodiments, to identify the viewer, the identity of the viewer is associated with the login information of a user of the video server. As an example, the video server may require users to provide login information before providing services. In some embodiments, the video server can determine the identity of the viewer by the device identification associated with the video preview request. Device identification includes various hardware identifications known in the art. In one embodiment, such device identification is issued by the video server to devices authenticated by the video server. In some embodiments, the video server authenticates a legitimate session based on a combination of hardware information and user information, e.g., a device identification and login information. In various embodiments, such authentication or identification will assist the video server to retrieve the viewer profile associated with the viewer.

In some embodiments, different viewers are associated with the same user login or otherwise authenticated session with the video server. As an example, different family members in a household may use a set-top box (STB) or set-top unit (STU) to access the video server. They may share the same login information, but access the video server at different times. In this case, different viewer files can be established, e.g., based on different habitual viewing history at different times of the day, the week, etc. Accordingly, the video server can retrieve the correct viewer profile based on the respective time associated with these associated viewer profiles.

Next, at block 220, the video server, e.g., via preview module 116 of FIG. 1, selects one or more video clips from the video based on the viewer profile. In one embodiment, the video server selects an appropriate version of the video, e.g., based on the language or region associated with the viewer profile. The video server then analyzes the viewer profile to select one or more video categories favored by the viewer according to the viewer profile. Further, the video server selects one or more video clips from those selected video categories.

In some embodiments, the video server selects a video clip associated with a video category from the video when a weight of the video category associated with the viewer profile meets a selection condition. In some implementations, the selection condition may be related to the ranks of respective video category on the viewer profile. As an example, the top one or two ranked video categories are chosen as candidates. In some implementations, the selection condition may be related to a predetermined weight threshold. As an example, a video category having weight exceeding the predetermined threshold will be chosen. Then, video clips associated with those chosen video categories become candidate video clips to build a customized video preview for the user. Within a chosen video category, video clips are selected based on their respective ranks. Additionally, such selection is also restricted based on the time limitations, e.g., allocated to the particular video category.

Next, at block 230, video server, e.g., via preview module 116 of FIG. 1, generates a customized video preview from the one or more video clips for the viewer based on the viewer profile. In various embodiments, the video server determines a particular sequence to assemble the one or more video clips based on the viewer profile, e.g., based on the rank or weight of respective video categories associated with the one or more video clips. The video server may additionally allocate time for each selected video clip based on the viewer profile.

In some embodiments, the sequence to assemble video clips for the video preview is derived from the respective weight or rank of the corresponding video categories of the selected video clips in the viewer profile. By way of example, for the viewer associated with the viewer profile in Table 2 above, if one action clip and one comedy clip are selected, then the action clip will be placed before the comedy clip because the associated weight of the former is greater than the associated weight of the later.

Respective time allocated to different video clips can also be derived from the respective weight or rank of the corresponding video categories of the selected video clips in the viewer profile. In one embodiment, using the viewer associated with the viewer profile in Table 2 above again, if only one action clip and only one comedy clip are selected to compose a one-minute video preview, then the action clip will be allocated 48 seconds, and the comedy clip will get the remaining 12 seconds, based on their respective weights in the viewer profile.

Referring now to FIG. 3, it is a flow diagram of an example process 300 for generating video previews based on viewer profiles, which may be practiced by an example apparatus in accordance with various embodiments. As shown, process 300 may be performed by video server 110 of FIG. 1 to implement one or more embodiments of the present disclosure. Similar to process 200, in various embodiments, process 300 can have fewer or additional operations, or perform some of the operations in different orders.

In various embodiments, process 300 begins at block 310, where a video preview request is received by the video server. Process 300 continues at block 320, where the video server determines whether a corresponding viewer profile exits for the preview request. If a viewer profile cannot be found for the viewer, then process 300 continues to block 332, wherein the video server starts to gather information for the viewer. As an example, the video server may request the viewer to update user account information or answer a questionnaire to provide relevant information. Further, the video server will gather the viewing history of the viewer at block 334. In some instances, even a new user for the video server may have a viewing history, e.g., from another video server that is associated with the new user, or from related services provided by the video server to the new user. Then, at block 336, the video server builds a viewer profile for the viewer associated with the preview request. As discussed herein, a default viewer profile can be used as the basis for the viewer, e.g., based on the demographic information of the viewer. Further, the default viewer profile can be updated, e.g., according to the viewing history gathered at block 334.

Returning to block 320, if the video server determines that a viewer profile has been found at block 320 or established after block 336, and then the video server handles the preview request at block 342 to select appropriate video categories for the preview request. In some embodiments, the video server selects one or more top ranked video categories from the viewer profile or selects video categories that exceed a threshold value. Then, at block 344, the video server allocates time to each selected video category based on, e.g., the respective weights of the selected video category. In one embodiment, for example, assuming that the normalized weight for a particular video category is x, then the time allocated to this particular video category can be determined based on the product of the total time of the video preview and the normalized weight (x). In other words, such time allocations are proportional to the respective weights of various video categories in this embodiment. A video preview is often restricted by relatively short time duration. By allocating more time to a video category favored by the viewer, it enhances the chance to build a video clip liked by the viewer into the short video preview.

The video server then selects relevant video clips at block 346, e.g., based on the selected video categories. In one embodiment, the video server selects one or more top ranked video clips from the full-length video based on these selected one or more top ranked video categories. As a result, a top ranked video clip in the video category highly ranked by the viewer is likely to be selected to build such a customized video preview for the viewer.

At block 348, the selected one or more video clips need to be marshalled in a proper order or sequence. In one embodiment, the video server interlaces the video clips in a round-robin scheduling method based on their respective video categories. As an example, the video server places the highest ranked video clip in the highest ranked video category first, then the highest ranked video clip in the second highest ranked video category second, and so on, until all the selected video clips are placed in the queue. In one embodiment, the video server simply marshals the selected video clips based on the ranks of their respective video categories first, then within a video category, based on the ranks of the selected video clips. In other embodiments, the selected video clips may be marshaled based on other suitable orders or sequences.

At block 352, the video server can edit the video preview, e.g., adding transitions between two video clips, modifying the beginning or ending of the video preview, or cutting an individual video clip. Finally, at block 360, the video server delivers the video preview, e.g., to the viewer in response to the preview request received at block 310.

Figure 4:
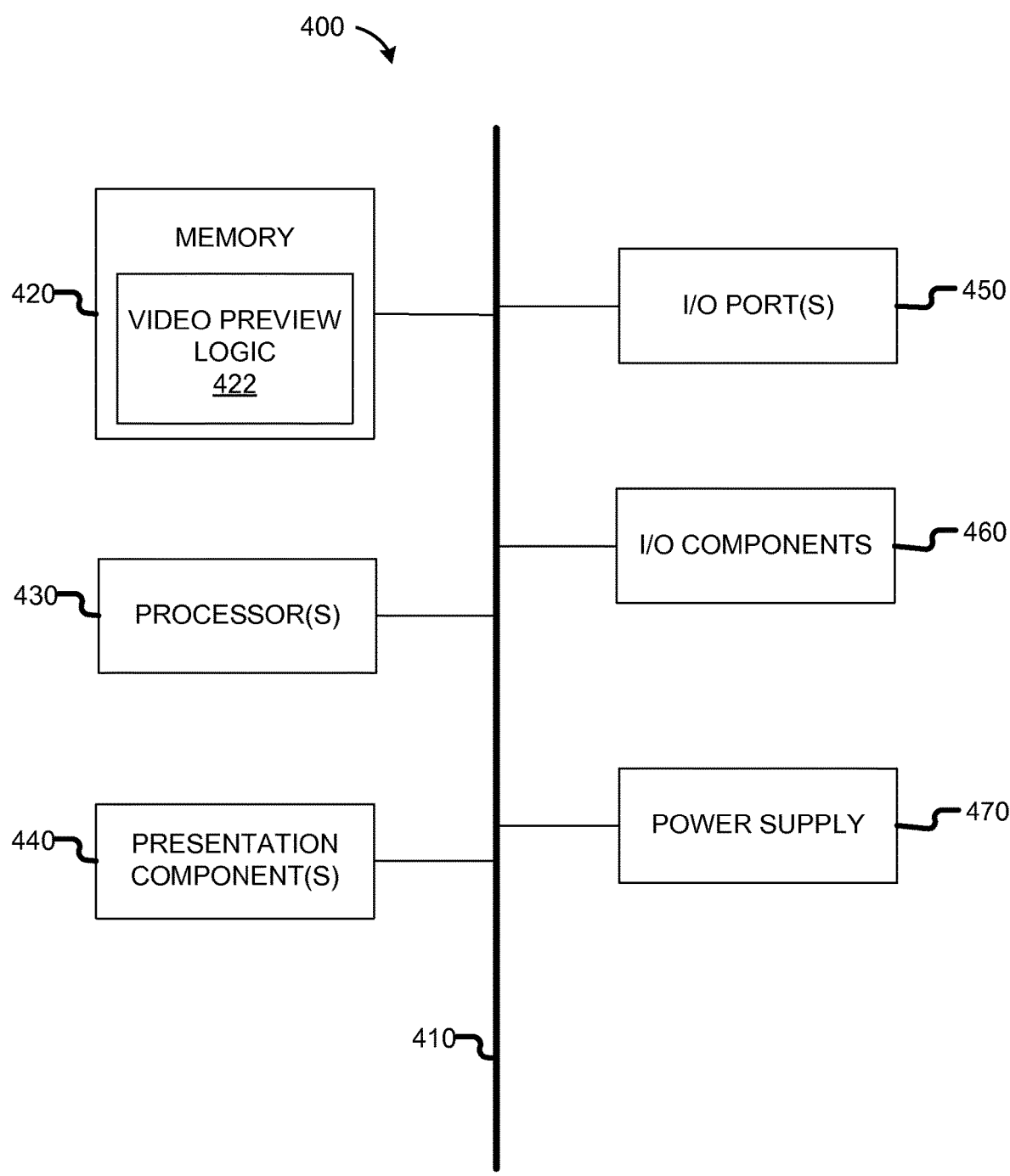
FIG. 4 illustrates an example computing device suitable for practicing the disclosed embodiments, in accordance with various embodiments.

Having briefly described an overview of embodiments of the present invention, an exemplary operating environment in which embodiments of the present invention may be implemented is described below in order to provide a general context for various aspects of the present invention. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes a bus 410 that directly or indirectly couples the following devices: memory 420, one or more processors 430, one or more presentation components 440, input/output (I/O) ports 450, input/output (I/O) components 460, and an illustrative power supply 470. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 4 is merely illustrative of an exemplary computing device that can be used in connection with one or more embodiments of the present invention. Distinction is not made between such categories as "workstation," "server," "laptop," "handheld device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 420 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 420 or I/O components 460. Presentation component(s) 440 present data indications to a user or other device. Exemplary presentation components include a display device, speaker, printing component, vibrating component, etc.

In various embodiments, memory 420 includes, in particular, temporal and persistent copies of video preview logic 422. Video preview logic 422 includes instructions that, when executed by one or more processors 430, result in computing device 400 generating video previews based on viewer profiles, such as, but not limited to, process 200 or process 300. In various embodiments, video preview logic 422 includes instructions that, when executed by processor 430, result in computing device 400 performing various functions associated with, but not limited to, user module 114 or preview module 116 in connection with FIG. 1.

In some embodiments, one or more processors 430 may be packaged together with video preview logic 422. In some embodiments, one or more processors 430 may be packaged together with video preview logic 422 to form a System in Package (SiP). In some embodiments, one or more processors 430 can be integrated on the same die with video preview logic 422. In some embodiments, processor 430 can be integrated on the same die with video preview logic 422 to form a System on Chip (SoC).

I/O ports 450 allow computing device 400 to be logically coupled to other devices including I/O components 460, some of which may be built in. Illustrative components include a microphone, joystick, game pad, satellite dish, scanner, printer, wireless device, etc. The I/O components 460 can also provide a natural user interface (NUI) that processes air gestures, voice, or other physiological inputs generated by a user. In some embodiments, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be equipped with depth cameras, such as stereoscopic camera systems, infrared camera systems, RGB camera systems, touchscreen technology, and combinations of these, for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A computer-implemented method for generating video previews from a video comprising:

retrieving a preference weight for a video category from a viewer profile;

determining a time period of a customized video preview based on the preference weight for the video category;

allocating a portion of the customized video preview corresponding to the time period to the video category;

in response to the portion of the customized video preview being allocated to the video category, selecting a video clip associated with the video category based on a rank of the video clip among a plurality of video clips in the video category; and generating the portion of the customized video preview based on the video clip.

2. The method of claim 1, further comprising:

identifying the video category from a plurality of video categories based on the preference weight for the video category in the viewer profile being above a predetermined threshold.

3. The method of claim 1, wherein the selecting comprises determining the video clip having a top rank among the plurality of video clips in the video category.

4. The method of claim 1, wherein the video clip is a first video clip, the method further comprising:

selecting a second video clip from the video category;

determining an order between the first video clip and the second video clip based on their respective ranks; and inserting the first video clip and the second video clip to the customized video preview based on the order.

5. The method of claim 1, further comprising:

categorizing the video clip to the video category based on a majority opinion gathered from a plurality of viewers.

6. The method of claim 1, further comprising:

categorizing the video clip to the video category based on audio or video effects associated with the video clip.

7. One or more non-transitory computer storage media storing computer-readable instructions that, when executed by one or more processors of a computer system, cause the computer system to perform operations comprising:

associating video clips in a video to a plurality of video categories;

ranking a plurality of video clips in a category of the plurality of video categories;

allocating a portion of a customized video preview to the category based on a weight of the category in a viewer profile of a viewer;

selecting a video clip from the plurality of video clips based on a rank of the video clip; and generating the customized video preview for the viewer based on the video clip.

8. The storage media of claim 7, wherein the operations further comprising:

assigning weights to the plurality of video categories on the viewer profile based on respective viewing frequencies of the plurality of video categories by the viewer.

9. The storage media of claim 7, wherein the operations further comprising:

identifying the category based on the weight of the category being above a predetermined threshold.

10. The storage media of claim 7, wherein the operations further comprising:

choosing two video categories from the viewer profile of the viewer; and allocating respective time of the customized video preview to the two video categories based on respective weights of the two video categories in the viewer profile.

11. The storage media of claim 7, wherein the operations further comprising:

determining an order of two video clips from two different video categories in the customized video preview based on respective weights of the two different video categories in the viewer profile of the viewer.

12. The storage media of claim 7, wherein the operations further comprising:

categorizing the plurality of video clips into a set of predefined categories based on a majority opinion from a plurality of users.

13. A system for generating video previews, comprising:

means for allocating a time period of a customized video preview to a top ranked video category on a viewer profile of a viewer, wherein means for allocating the time period comprise means for allocating the time period based on a weight of the top ranked video category in the viewer profile of the viewer;

means for in response to the time period of the customized video preview being allocated to the top ranked video category, selecting a video clip in the top ranked video category based on a rank of the video clip; and means for generating the customized video preview with the video clip.

14. The system of claim 13, further comprising:

means for updating weights of a plurality of video categories associated with the viewer profile based on respective viewing frequencies of the plurality of video categories by the viewer.

15. The system of claim 13, further comprising:

means for allocate respective time to two video categories for the customized video preview based on respective weights of the two video categories in the viewer profile.

16. The system of claim 13, further comprising:

means for determining an order of two video clips of two video categories based on respective weights of the two video categories in the viewer profile.

* * * * *